United States Patent [19]
Goldsmith

[11] Patent Number: 5,143,390
[45] Date of Patent: Sep. 1, 1992

[54] PRESSURIZATION APPARATUS FOR CYCLE MOUNTED ACCESSORIES

[76] Inventor: Patrick M. Goldsmith, 3949 Clifton Ridge, Highland, Mich. 48357

[21] Appl. No.: 620,084

[22] Filed: Nov. 30, 1990

[51] Int. Cl.$^5$ .............................................. B62J 11/02
[52] U.S. Cl. ................................... 280/201; 280/288.4; 222/94; 222/105; 222/209; 222/386.5; 222/608
[58] Field of Search ................... 280/288.4, 201, 281.1, 280/274, 288.3, 304.5; 222/94, 105, 206, 209, 212, 213, 386.5, 608

[56] References Cited

U.S. PATENT DOCUMENTS

| | | | |
|---|---|---|---|
| 581,767 | 5/1897 | Powers | 222/130 |
| 702,976 | 6/1902 | Lymburner | 280/201 |
| 1,933,223 | 10/1933 | Skui | 208/155 |
| 2,027,758 | 1/1936 | Zuckar | 208/155 |
| 4,147,278 | 4/1979 | Uhlig | 222/94 |
| 4,150,681 | 4/1979 | Howarth, Jr. | 134/172 |
| 4,185,670 | 1/1980 | Sartell, Jr. | 141/94 |
| 4,526,298 | 7/1985 | Boxer et al. | 222/130 |
| 4,629,098 | 12/1986 | Eger | 222/175 |
| 4,807,813 | 2/1989 | Coleman | 239/153 |
| 4,815,635 | 3/1989 | Porter | 222/136 |
| 4,842,290 | 6/1989 | Alioto | 280/201 |
| 4,867,344 | 9/1989 | Bitterly | 222/94 |
| 4,911,339 | 3/1990 | Cushing | 222/610 |
| 5,007,556 | 4/1991 | Lover | 222/386.5 |
| 5,012,956 | 5/1991 | Stoody | 222/94 |

FOREIGN PATENT DOCUMENTS

| | | | |
|---|---|---|---|
| 0362912 | 4/1990 | European Pat. Off. | 280/281.1 |
| 0482992 | 7/1953 | Italy | 280/201 |
| 0080308 | 7/1918 | Switzerland | 280/201 |
| 0009268 | of 1897 | United Kingdom | 280/201 |

Primary Examiner—Charles A. Marmor
Assistant Examiner—A. M. Boehler
Attorney, Agent, or Firm—Basile and Hanlon

[57] ABSTRACT

A pressure chamber is formed interiorly within one or more of the hollow tubular members of a cycle frame. Pressurized fluid, such as air, is supplied from the pressure camber by conduits through a pressure regulator and a control valve to a cycle mounted accessory, such as a pressurized fluid container or an inflatable seat. In one embodiment, the fluid container includes an expandable bag which expands as pressurized fluid is supplied thereto. The expandable bag pressurizes the liquid contents of the container to facilitate the discharge of the liquid through a discharge conduit which terminates adjacent the cyclist's face. The pressurization apparatus may also be employed to inflate an inflatable cycle seat or the cycle tires, or to pressurize the cycle frame for stiffness.

7 Claims, 3 Drawing Sheets

PRESSURIZATION APPARATUS FOR CYCLE MOUNTED ACCESSORIES

BACKGROUND OF THE INVENTION

1. Field of the Invention

The present invention relates, in general to cycles and, specifically, to pressurization apparatus for cycle mounted accessories, such as fluid bottles, inflatable seats and the like.

2. State of the Art

Cyclists, particularly those racing or traveling long distances, frequently require a drink of water, juice or other fluid for refreshment or to prevent dehydration. Typically, a water bottle is mounted in a cage attached to the frame of the bicycle. However, the movement of the rider in removing the bottle from the cage whenever he wants a drink creates several potentially dangerous conditions and disadvantages.

During races and long distance cycling, the rider typically removes the water from the cage on the frame while continuing to pedal the bicycle. The rider thus steers and balances the cycle one-handed while taking a drink. During this time, the rider's attention is not on the road as he is concentrating on taking a drink.

The rider must also reach down and remove the bottle from the cage which is typically mounted on the down tube or seat post of the bicycle frame and then sit up and tilt his head backward to drink from the bottle. These motions break the aerodynamic tuck position favored by cyclists in racing and causes the bicycle to slow down.

In order to overcome these disadvantages, several water supply systems have been devised which automatically supply water or fluid to the mouth of a rider when activated. Several of these systems employ a manually operated pump connected to the water bottle for pressurizing the bottle to facilitate the discharge of fluid from the bottle to the rider. A discharge nozzle at one end of a conduit attached to the bottle is attached on the handlebars of the bicycle to discharge water or fluid into the mouth or over the face of the rider. This minimizes the amount of movement required by the rider to obtain a drink of water or fluid. However, as the contents of the bottle are consumed or used, the pressure in the bottle drops and it becomes more and more difficult to obtain subsequent drinks without greater effort on the part of the rider. The manually operated pumps attached to such water bottles require subsequent pumping by the rider to maintain the pressure within the bottle at a predetermined level for easy discharge of fluid from the bottle.

Thus, it would be desirable to provide a cycle mounted pressurization apparatus which overcomes the disadvantages of previously devised cycle pressurization apparatus. It would also be desirable to provide a cycle mounted pressurization apparatus particularly suited for delivering fluid to the mouth of a rider. It would also be desirable to provide a cycle mounted pressurization apparatus which enables a rider to obtain a drink without movement from a normal riding position. It would also be desirable to provide a cycle mounted pressurization apparatus which may be easily attached to most conventionally designed cycles. It would also be desirable to provide a cycle mounted pressurization apparatus particularly suited for delivering fluids which easily maintains a desired pressure level throughout the use of the bottle. It would also be desirable to provide a cycle mounted pressurization apparatus which is capable of supplying pressurized fluid to operate a number of different cycle accessories or components, such as an inflatable seat, the cycle tires, or a pressurized frame, to name a few.

SUMMARY OF THE INVENTION

The present invention is a pressurization apparatus for cycle mounted accessories. In a conventional cycle, such as a bicycle, a frame is formed of a plurality of interconnected, tubular members.

In one embodiment of the present invention, a fluid chamber is formed in at least one of the tubular members for storing a fluid, such as air or other gases, under pressure. Valve means are disposed in fluid flow communication with the fluid chamber in the tubular member for supplying fluid to the chamber and for selectively discharging pressurized fluid from the chamber. Preferably, the valve means comprises separate inlet and outlet valves mounted on a tubular member of the cycle frame. Further, a fluid chamber may be formed in a plurality of the tubular members of the cycle frame, each interconnected via fluid flow paths to form an enlarged fluid chamber within the frame.

In another embodiment, a pressurized fluid responsive device is mounted on the cycle and connected in fluid flow communication with the fluid chamber by conduits. In this embodiment, a pressure regulator means and a manually operable control valve are connected in series between the valve means on the fluid chamber and the pressurized fluid responsive device mounted on the cycle. The pressure regulating means regulates the pressure supplied to the pressurized fluid responsive device to a preset level. The control valve provides selective operator control to supply pressurized fluid from the fluid chamber to the pressurized fluid responsive device to operate the device or to maintain the pressure in the device at a preset level.

The pressurized fluid responsive device may comprise one or more of a fluid container and delivery system, an inflatable seat, the cycle tires or the frame of the cycle itself.

The fluid container stores a dischargeable liquid, such as water, etc., and has an inlet and an outlet. The inlet is connected to the pressurized fluid chamber for supplying pressurized fluid, such as air, to the container to pressurize the liquid contents of the container. A conduit is connected to the outlet for discharging the liquid contents of the container to the rider of the cycle.

In a preferred embodiment, an expansible chamber is disposed in the container in fluid flow communication with the inlet of the container. The outlet is disposed in fluid flow communication with the interior of the container between the walls forming the container and the exterior of the expansible container. Pressurized fluid from the fluid chamber causes the expansible chamber to expand and pressurize the liquid contents within the container; while isolating the pressurized fluid from the liquid in the container. A second valve means is connected to the outlet of the container for selectively discharging liquid from the container under pressure.

A similar pressurized fluid delivery system may be provided for inflating an expansible chamber formed in the cycle seat. A separate pressure regulator means and control valve are serially connected between the fluid chamber and the expansible chamber within the seat to pressurize and inflate the seat to a predetermined amount. The valve also enables the seat to be deflated as desired by the rider.

The pressurization apparatus of the present invention uniquely provides a pressurized fluid for operating various cycle mounted accessories. The pressurization apparatus is simple in construction and may be easily mounted or used on most conventional cycles. The pressurization apparatus may be employed to operate various accessories, such as a liquid delivery system, an inflatable seat, pressurization of the cycle frame for stiffness, as well as, with slight modification, to inflate the cycle tires. The pressurization apparatus maintains pressure in the accessory, such as a liquid delivery container, as the contents of the container are gradually removed or used. The pressurization apparatus, when employed to operate a pressurized liquid delivery system, enables such liquids to be drunk or used by the rider without requiring excessive movement of the rider from his normal riding position to obtain a drink.

The unique fluid container construction of one embodiment of the present invention prevents contact between the pressurized fluid, which is normally ambient air, and the consumable liquid, such as water, juice, etc. This maintains the sterility or purity of the consumable liquid.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
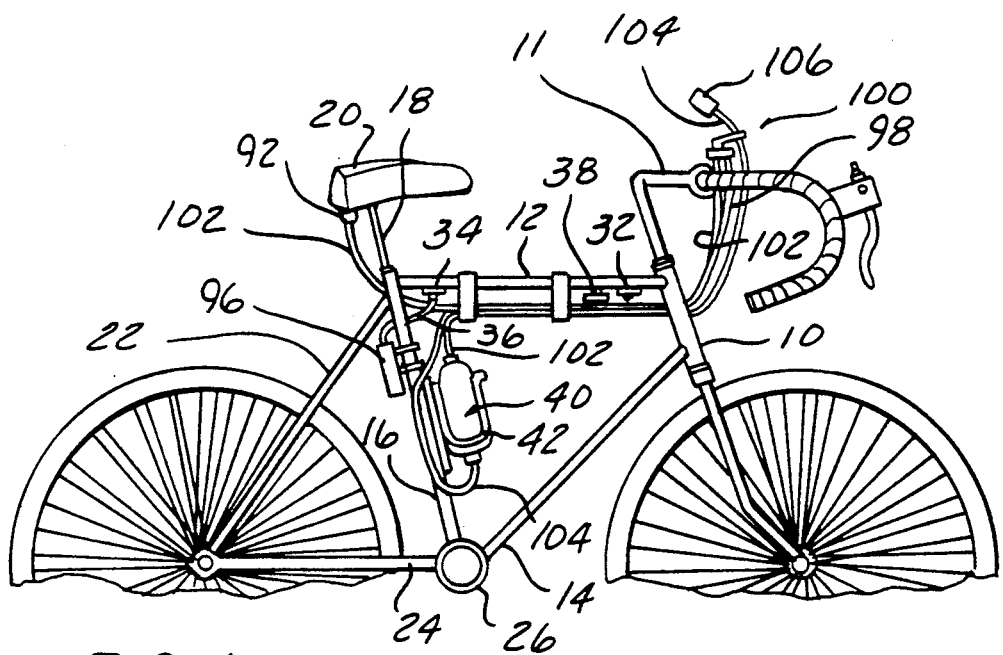
FIG. 1 is a side elevational view of a cycle equipped with a pressurization apparatus in accordance with the present invention.
Figure 2:
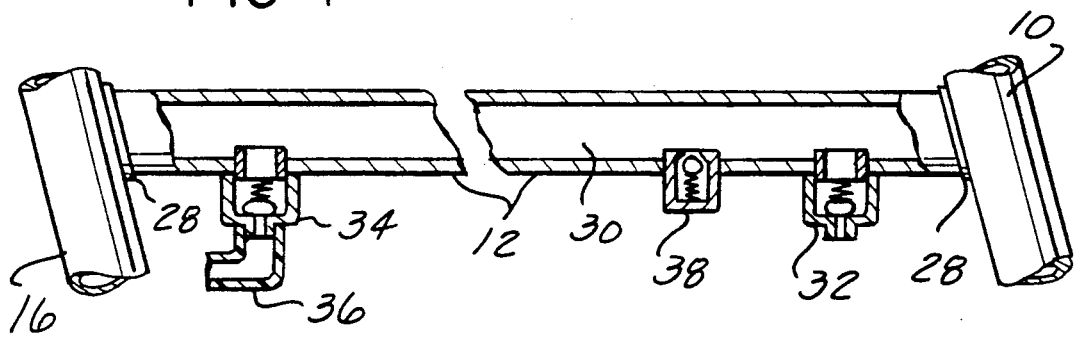
FIG. 2 is a partial, cross sectional view of a pressurized chamber formed in one of the tubular members of the cycle frame shown in FIG. 1.
Figure 3:
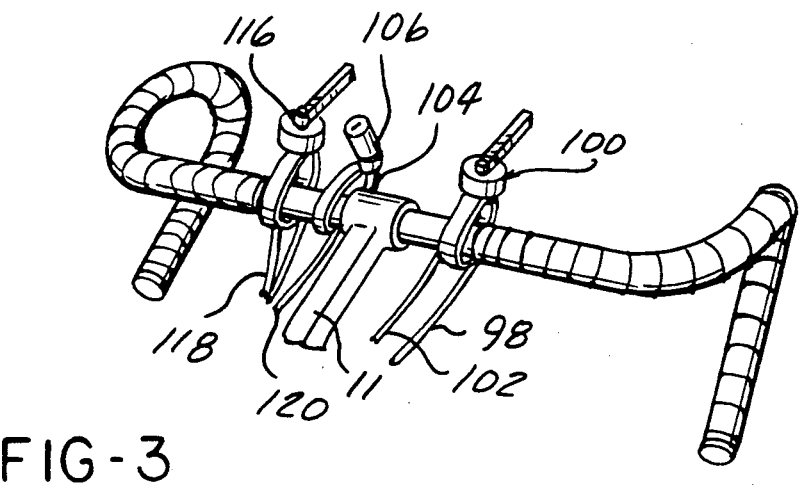
FIG. 3 is a partial perspective view showing the mounting of several components of the pressurization apparatus on the handlebars of the cycle shown in FIG. 1.

Referring now the drawing, and to FIGS. 1, 2 and 3 in particular, there is depicted a pressurization apparatus for cycle mounted accessories. It will be understood that even though a bicycle is depicted in the drawing and described hereafter in combination with the pressurization apparatus of the present invention, it will be understood that the term "cycle" as used herein is meant to include any type of velocipede which is propelled or ridden by a rider, such as a bicycle, motorcycle, scooter, etc.

As is conventional, a bicycle includes a frame formed of a plurality of interconnected, tubular members. A conventional frame includes a head post 10 for supporting a front wheel fork, a top tube 12, a down tube 14, a seat post 16 which receives a seat stem 18 connected to a seat 20, an upper seat stay 22, a lower chain stay 24 and a bottom bracket 26.

The hollow tubular members forming the frame can be constructed of a variety of materials, such as steel, aluminum as well as combinations of carbon and Kevlar. The tubular members forming the frame are typically hollow and, in the case of metallic tubular members, are secured at their ends to the adjoining frame tubular members by suitable means, such as by welding. As shown in FIG. 2, the top tube 12 is secured at its opposite ends to the head post 10 and the seat post 16 by means of welds 28.

According to the present invention, an internal fluid chamber or source 30 is formed in at least one of the tubular members forming the frame of the cycle for storing a fluid, such as air or other gases, under pressure. As shown in FIG. 2, the pressurized fluid chamber 30 is formed in the top tube 12 of the frame. It will be understood that this is by way of example only and the pressurized fluid chamber may be formed in any of the other tubular members, such as the down tube 14, the seat post 16, the upper and lower chain stays 22 and 24, etc. Further, an enlarged pressurized fluid chamber may be formed by connecting individual fluid chambers in a plurality of the tubular members, such as the top tube 12, the down tube 14, the head post 10 and the seat post 16, by through bores to form an enlarged pressure chamber having greater pressurized fluid storage capacity.

Referring to the example shown in FIG. 2, since the ends of the top tube 12 are securely connected to the head post 10 and the seat post 16, the hollow interior of the top tube 12 is sealed so as to form a pressurized fluid chamber 30 capable of storing a fluid, such as air, under a high pressure, for example, 60 psi. Alternately, end caps, not shown, may be sealingly mounted in the ends of the top tube 12 to form the sealed internal chamber 30.

Valve means are disposed in fluid flow communication with the pressurized fluid chamber 30 for supplying pressurized fluid to the chamber 30 and for selectively discharging pressurized fluid from the chamber 30. In a preferred embodiment, the valve means includes an inlet valve 32 and an outlet valve 34. The inlet valve 32 is securely mounted on the top tube 12 and may be constructed of any conventional type of valve, such as a needle valve commonly found in bicycle tires. The inlet valve 32 is disposed in fluid flow communication with the fluid chamber 30 to enable a source of pressurized fluid to be connected to the valve 30 to supply pressurized fluid to the fluid chamber 30. The outlet valve 34 is similarly mounted on the top tube 12 and is disposed in fluid flow communication with the fluid chamber 30. The outlet valve 34, which may be any conventional type of valve, is connected via a conduit 36 to a fluid pressure responsive device, as described hereafter. This provides a path for discharge of the pressurized fluid in the chamber 30 through the outlet valve 34 to the pressurized fluid responsive device. A pressure relief valve 38 may also be mounted on the top tube 12. The pressure relief valve 38 may be in the form of a conventional check valve to provide a maximum pressure limit within the top tube 12. This prevents the top tube 12 from being pressurized beyond its strength.

In one embodiment of the present invention, the pressurized fluid chamber and valve means may be formed in one or more of the tubular members of the cycle frame to receive pressurized fluid. The pressure level of the fluid in such pressure chambers may be selected to provide a desired degree of stiffness to the frame of the cycle. This is advantageous in frames formed of hollow steel tubular members which are generally less stiff than aluminum frames.

It should be noted that the valve means connected to the pressurized fluid chamber 30 may comprise a single valve for both supplying and discharging pressurized fluid to and from the pressure chamber 30. In this embodiment, the conduit connecting the valve means to the pressurized fluid responsive device mounted on the cycle is removed from the valve means to enable pressurized fluid to be supplied through the valve means into the pressurized fluid chamber 30.

In another embodiment, the pressurized fluid apparatus of the present invention is advantageously employed to activate one or more fluid pressure responsive accessories mounted on the cycle. One of these accessories may be a fluid or liquid container 40, such as a water or juice bottle. The fluid container 40 generally comprises a hollow container formed of a suitable material, such as a plastic. The fluid container 40, as shown in FIG. 1, is mounted on a conventional carrier or cage 42 which is attached to one of the tubular members of the cycle frame, such as the seat post 16. The frame 42 may also be mounted on other tubular members of the cycle frame, such as the down tube 14.

Figure 5:
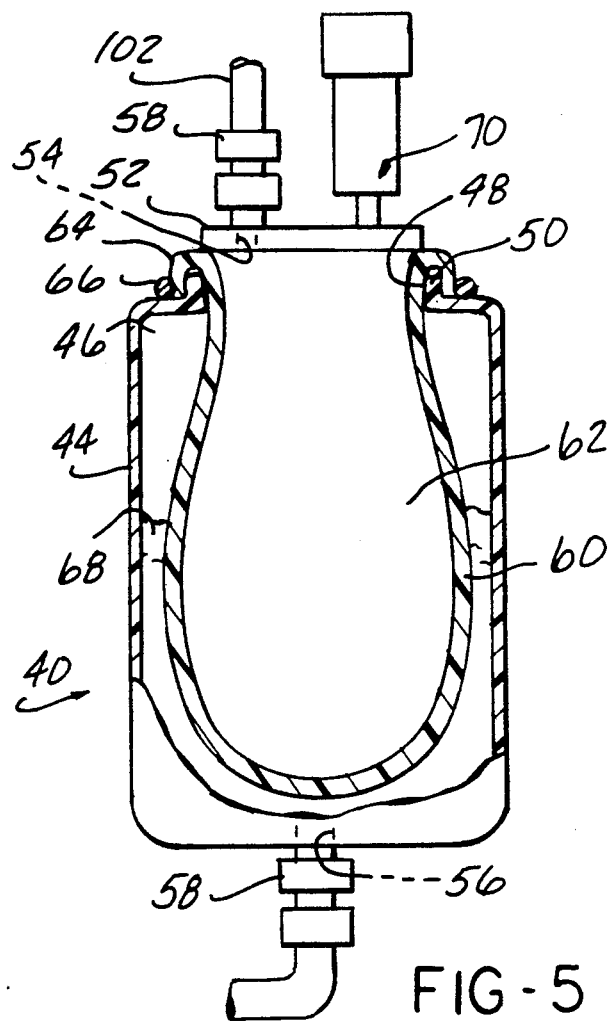
FIG. 5 is a partially cross sectioned, side elevational view of a fluid container employed as an accessory on the cycle shown in FIG. 1.
Figure 6:
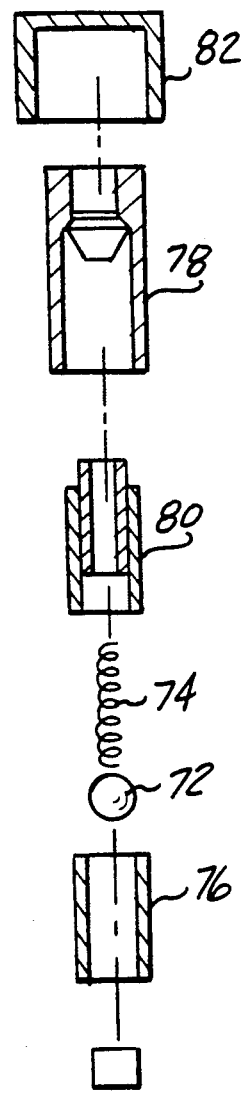
FIG. 6 is an exploded, cross sectional view of the pressure relief valve assembly used with the fluid container shown in FIG. 5.

As shown in greater detail in FIGS. 5 and 6, the fluid container 40 comprises a hollow body 44 which is formed with a hollow, interior chamber 46. One end of the body 44 has an aperture forming an open end 48. A generally outwardly extending flange or collar 50 surrounds the open end 48 and releasably and sealingly receives a cap 52 thereover. The cap 52 is sealingly connected to the flange 50 by any suitable means, such as threads, a snap fit, etc.

An inlet 54 is formed in the cap 52 and is disposed in fluid flow communication with the interior chamber 46 in the body 44. An outlet 56 is also formed in the body 44 in fluid flow communication with the interior chamber 46. Conventional quick disconnect fittings denoted in general by reference number 58 are connected to each of the inlet and outlets 54 and 56.

In a preferred embodiment, an expansible, flexible member 60 is movably disposed in the chamber 46 in the body 44. The expandable member 60 has a general bag-like shape so as to form a hollow, expandable chamber 62 when the upper end 64 of the expandable member 60 is sealing connected to the flange 50 surrounding the open end 48 of the body 44.

In use, the upper end 64 of the expandable member 60 is folded over the flange 50 such that the main portion of the expandable member 60 extends into the chamber 46 in the body 44 to form a chamber 62. A seal ring 66, such as an O-ring, is snapped around the folded over upper end 64 of the expandable member 60 and the flange 50 to sealingly mount the expandable member 60 on the body 44 of the fluid container 40. After the cap 52 is mounted on the collar 50, pressurized fluid, such as air, from the fluid pressure chamber 30, as described hereafter, is supplied through the inlet 54 in the cap 52 to the chamber 62 formed between the expandable member 60 and the cap 52. This causes the expandable member 60 to expand and exert a predetermined pressure on the liquid contents 68 disposed within the chamber 46 between the walls forming the body 44 of the container 40 and the outer surface of the expandable member 60. This arrangement separates the pressurized fluid within the expandable member 60 from the liquid 68 in the body 44 and prevents contact between these fluids which could contaminate the liquid 68 which is normally consumed by a rider of the cycle.

The liquid 68 is supplied to the body 44 of the fluid container 40 prior to the mounting of the upper end 64 of the expandable member 60 to the flange 50 on the body 44 and prior to the attachment of the cap 52 onto the flange 50.

A pressure relief valve 70 may also be mounted on the cap 52 so as to set an upper pressure limit within the expandable chamber 62. As shown in FIG. 6, the pressure relief 70 includes a ball check 72 which is biased by a coil spring 74 into an inlet member 76. A threadingly attachable needle valve 78 is engageable with a spring seat 80 for adjusting the biasing force exerted by the spring 74 on the ball check 72. Rotation of a housing 82 adjusts the needle valve 78 with respect to the spring seat 80 to vary the spring force exerted by the spring 74.

It should be noted that the pressure relief 70 is described only an as option as other pressure regulator means, as will be subsequently described, are employed for maintaining the pressure within the fluid container 40 at a preset, low level sufficient for pressurized discharge of the liquid 68 from the container 40 to the rider of the cycle.

Another accessory which may be advantageously used with the pressurization apparatus of the present invention is an inflatable seat. The seat 20 shown in FIGS. 1 and 4 may be designed with an inflatable, sealed internal chamber 90. A valve 92 is connected to the internal chamber 90 for supplying pressurized fluid to the chamber 90 as well as discharging fluid therefrom.

Figure 4:
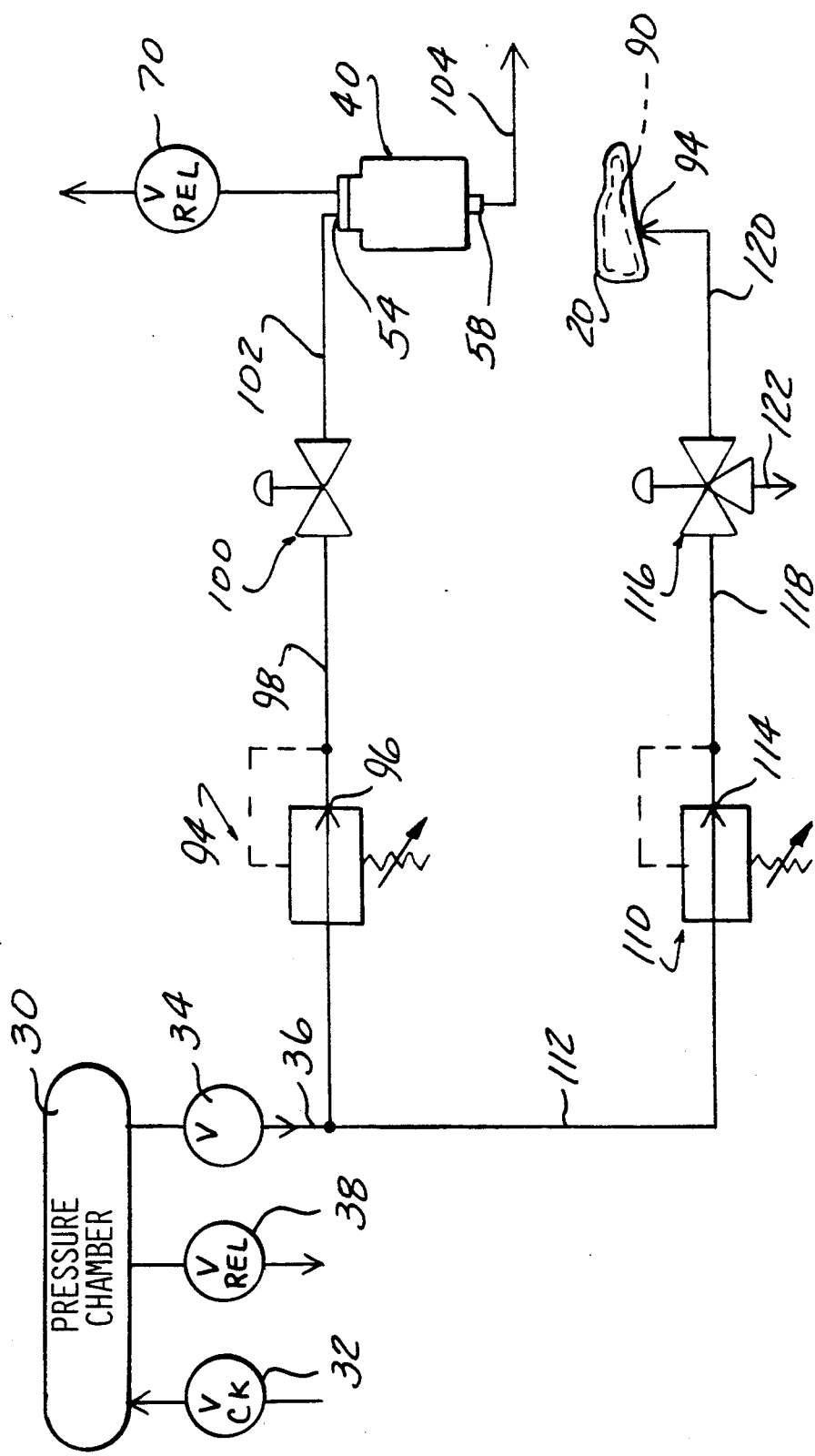
FIG. 4 is a schematic diagram of the fluid circuit employed in the pressurization apparatus of the present invention.
Figure 7:
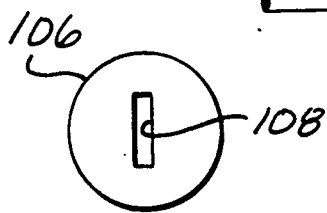
FIG. 7 is an end view of the fluid delivery conduit shown in FIG. 1; depicted in its normally closed position.
Figure 8:
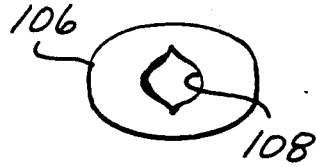
FIG. 8 is an end view of the fluid delivery conduit shown in its open position.

A detailed description of the fluid circuit employed by the pressurization apparatus of the present invention will now be provided with specific reference to FIGS. 1 and 4. The outlet valve 34 on the fluid pressure chamber 30 is attached to a conduit 36, such as a flexible plastic tube. The conduit 36 is connected between the outlet valve 34 and a first pressure regulator means 94 as shown in FIG. 4. The first pressure regulator means 94 is mounted in a suitable housing or container 96 which is secured to the cycle frame, such as to the seat post 16 as shown in FIG. 1. The first pressure regulator means 94 may be formed of any suitable pressure regulator for maintaining the pressure supplied to the fluid container 40 at a preset level. By way of example only, the pressure chamber 30 is pressurized to 60 psi. The first pressure regulator means 94 is set to maintain an outlet pressure of 2 psi which is sufficient to pressurize the fluid container 40. The outlet 96 of the first pressure regulator means 94 is connected by a conduit 98 to a first manually operated control valve 100. The control valve 100 is a conventional two-way, manually operated valve which is attached or clipped to the handlebars 11 of the cycle as shown in FIG. 3. The two-way valve 100 is switchable between two positions, namely, an open position in which fluid at a low pressure is supplied from the outlet 94 of the first pressure regulator means 94 to the inlet 54 of the fluid container 40 and a closed position blocking the fluid flow path through the valve 100. A conduit 102 connects the first manually operated valve 100 to the inlet 54 of the fluid container 40. A discharge conduit 104 is connected to the outlet 58 of the fluid container 40. The discharge conduit 104 is also clipped or mounted by suitable means to the handlebars of the cycle as shown in FIG. 3. Preferably, the discharge conduit 104 is formed of a resilient material and is constructed such that the discharge end 106 of the discharge conduit 104 is normally resiliently biased to a position shown in FIG. 7 in which the hollow interior cavity 108 of the conduit 104 is closed to prevent the escape of liquid therefrom. However, when the rider desires to take a drink of liquid from the fluid container 40, he merely exerts pressure on the discharge end 106 of the conduit 104 deforming the discharge end 106 to the position shown in FIG. 8 in which the hollow interior cavity 108 opens to provide a path for liquid to flow from the fluid container 40 through the discharge end 106 to the rider of the cycle. Release of such pressure causes the discharge end 106 to resiliently move to the closed position shown in FIG. 7 blocking the further discharge of liquid therefrom.

A similar fluid circuit is provided for the inflatable seat 20. A second pressure regulator means 110 is mounted in the housing 96 and is connected by a conduit 112 to the outlet valve 34 of the fluid pressure chamber 30. This connection may be by means of a tee connection to the conduit 36 as shown in FIG. 4. The second pressure regulator means 110 provides a second pressure at its outlet 114, such as 30 psi, for supplying pressurized fluid to the inflatable chamber 90 in the seat 20. A three-way, manually operated valve 116 is connected by a conduit 118 to the outlet 114 of the second pressure regulator means 110. The second manually operated valve 116 is mounted by means of a suitable clip to the handlebars 11 of the cycle, as shown in FIG. 3.

The three-way valve 116 is switchable between a first, normal blocking position, a second position in which pressurized fluid flows through the second pressure regulator means 110 to the seat 20 and a third, vent position in which the interior chamber 90 in the seat 20 is vented to atmosphere. A conduit 120 is connected between the three-way valve 116 and the inlet valve 9 connected to the inflatable chamber 90 in the seat 20.

In use, the rider of the cycle may move the three-way valve 116 to the second position to supply pressurized fluid from the fluid pressure chamber 30 through the second pressure regulator means 110 to the inflatable chamber 90 in the seat 20 until the desired degree of inflation of the seat 20 is achieved. The rider then moves the three-way valve 116 to the blocking or closed position to maintain the desired inflation of the seat 20. When the rider desires to decrease the amount of inflation of the seat 20, he need only move the three-way valve 116 to the vent position thereby connecting the inflatable chamber 90 in the seat 20 to the atmosphere through a vent port 122 in the three-way valve 116. The valve 116 may be closed when the desired degree of inflation of the seat 20 is again achieved or when the seat 20 is completely deflated.

The above-described pressurization apparatus for cycles may also be employed, with minor modifications, to inflate the tires of the cycle. Such modifications would require the use of a separate pressure regulator, conduit and valve extending from the chamber 30 which could be connected to the valve stem of a conventional tire.

Figure 9:
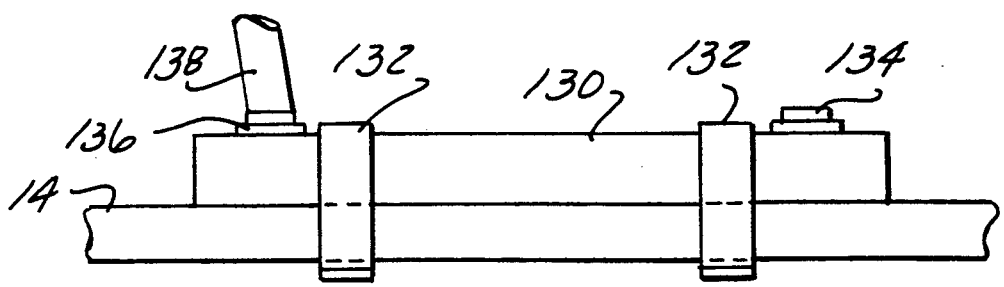
FIG. 9 is a partial, side elevational view showing another embodiment of the pressurized fluid chamber.

FIG. 9 depicts an alternate embodiment of the present invention which is ideally suited to supply pressurized fluid to a cycle mounted accessory, such as the inflatable seat 20 and/or the fluid container 40. In this embodiment, a separate, sealed tank 130 is mounted by means of suitable straps or clips 132 to one of the tubular members forming the frame of the cycle. By way of example only, the tank 130 is illustrated in FIG. 9 as being releasably attached via the mounting straps 132 to the down tube 14 of the cycle frame.

The tank 130 includes valve means for supplying pressurized fluid to the interior of the tank 130 and for selectively discharging the pressurized fluid to cycle mounted accessories in the same manner as the pressurization apparatus described above. Preferably, the valve means includes an inlet valve 134 and an outlet valve 136 which is connected by means of a conduit 138 to the fluid circuit mounted on the cycle.

The sealed tank 130 is ideally suited for supplying pressurized fluid to the expandable chamber 62 in the fluid container 40 to pressurize the interior of the fluid container 40 for the pressurized discharge of liquid from the container 40 as described above.

The pressurization apparatus described above may also be employed to operate amusement devices, such as squirt guns. In this application, a conventional squirt gun is connected to the discharge end 106 of the conduit 104. Depression of the trigger of the gun causes the discharge of fluid from the fluid container 40 under pressure through the gun.

In summary, there has been disclosed a unique pressurization apparatus for cycle mounted accessories which provides pressurized fluid to operate pressurized fluid responsive accessories mounted on a conventional cycle and/or to pressurize the frame of the cycle for additional stiffness. The pressurization apparatus is mountable on a conventional cycle and may be easily used by the rider of the cycle without requiring the rider to move from his normal riding position. The pressurization apparatus uniquely maintains a preset pressure on the pressure responsive accessories and enables the rider to adjust such pressure in an easy and expedient manner.

What is claimed is:

1. In a cycle having a frame formed of a plurality of interconnected, tubular members, the improvement comprising:

at least one of the tubular members having a sealed interior chamber for storing a pressurized fluid;

first valve means, mounted on the at least one of the tubular members and disposed in fluid flow communication with the interior chamber, for enabling the supply of pressurized fluid into the interior chamber and the discharge of pressurized fluid from the interior chamber;

second valve means connected in fluid flow communication with the interior chamber;

the second valve means being manually movable between a first position for discharging pressurized fluid from the interior chamber through the first valve means and a second position blocking the flow of pressurized fluid from the interior chamber; and a pressurized fluid responsive device mounted on the cycle and connected in fluid flow communication with the first valve means;

the pressurized fluid responsive device including:
- a hollow container for storing a liquid, the container having an inlet and an outlet;
- an expandable chamber disposed in the container;
- the inlet being disposed in fluid flow communication with the interior chamber and the interior of the expandable chamber such that pressurized fluid supplied through the inlet to the expandable chamber causes the expandable chamber to expand and exert pressure on the liquid in the container; and
- discharge valve means, connected in fluid flow communication with the outlet of the container, for selectively discharging liquid from the interior of the container.

2. The improvement of claim 1 wherein the first valve means comprises:
- inlet valve means disposed in fluid flow communication with the interior chamber for supplying pressurized fluid to the interior chamber; and
- outlet valve means, disposed in fluid flow communication with the interior chamber, for discharging preassembled fluid from the interior chamber to the pressurized fluid responsive device.

3. The improvement of claim 2 further including:
- first pressure regulating means, connected between the first and second valve means, for regulating the pressure therethrough to a predetermined amount.

4. The improvement of claim 1 wherein the pressurized fluid responsive device further comprises:
- a conduit connected to the outlet and the discharge valve means for discharging the liquid from the container.

5. The improvement of claim 2 further including:
- pressure regulator means, mounted on the container in fluid flow communication with the interior of the expandable chamber in the container, for regulating the pressure of the pressurized fluid in the expandable chamber to a predetermined amount.

6. The improvement of claim 1 wherein a seat is mounted on the cycle, the improvement further comprising:
- an expandable, sealed chamber formed interiorly within the seat;
- seat valve means disposed in fluid flow communication with the expandable chamber in the seat and the first valve means for supplying pressurized fluid from the interior chamber to the expandable chamber in the seat and for selectively discharging pressurized fluid from the expandable chamber in the seat.

7. The improvement of claim 1 wherein:
- the container has an open end;
- a cap releasably and sealingly mounted over an open end of the container, the inlet disposed in the cap;
- the expandable chamber includes an expandable bag-like member disposed within the container, with the end thereof sealingly connected to the edges surrounding the open end of the container, the interior of the bag-like member disposed in fluid flow communication with the inlet; and
- the outlet disposed in fluid flow communication with the container externally of the bag-like member.

* * * * *